US009600690B2

(12) United States Patent
Abt, Jr. et al.

(10) Patent No.: US 9,600,690 B2
(45) Date of Patent: *Mar. 21, 2017

(54) SECURE ACCESS FOR SENSITIVE DIGITAL INFORMATION

(71) Applicant: International Business Machines Corporation, Armonk, NY (US)

(72) Inventors: William F. Abt, Jr., Nashua, NH (US); Daniel A. Gisolfi, Hopewell, NY (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,701

(22) Filed: Nov. 6, 2015

(65) Prior Publication Data

US 2016/0063280 A1  Mar. 3, 2016

Related U.S. Application Data

(63) Continuation of application No. 14/471,193, filed on Aug. 28, 2014, now Pat. No. 9,230,135, which is a (Continued)

(51) Int. Cl.
*H04L 9/32* (2006.01)
*G06F 21/64* (2013.01)
(Continued)

(52) U.S. Cl.
CPC ........ *G06F 21/64* (2013.01); *G06F 17/30106* (2013.01); *G06F 21/60* (2013.01);
(Continued)

(58) Field of Classification Search
CPC . H04L 9/3247; H04L 2209/72; H04L 63/123; H04L 63/0823; H04L 2209/24
(Continued)

(56) References Cited

U.S. PATENT DOCUMENTS 6,622,015 B1   9/2003  Himmel et al.
6,925,075 B2 *  8/2005  Karagiannis ........ H04L 12/5695
                                                  370/238
(Continued)

FOREIGN PATENT DOCUMENTS

WO    2010130230 A1    11/2010
WO    2013072374 A1    5/2013

OTHER PUBLICATIONS

Coogan, G., "May I see your smartphone and registration please?", http://mobilepaymentstoday.com/blogs/8769/May-I-see-your-smart . . . , Aug. 28, 2012 (last accessed Apr. 25, 2014 3:50 PM).
(Continued)

*Primary Examiner* — Kambiz Zand
*Assistant Examiner* — Stephen Sanders
(74) *Attorney, Agent, or Firm* — Scully, Scott, Murphy & Presser, P.C.; John Pivnichny

(57) ABSTRACT

Sensitive pieces of information stored on an individual's device can be protected using a device identification system that applies, for each sensitive piece of information, a function that integrates an identifier of the individual with a respective sensitive piece of information to create a respective identity element. Each identity element can be signed with a signature to create a trust group. The identity element and signature can be uploaded to the individual's device using an application that is configured to provide a subset of the sensitive pieces of information in response to a query.

20 Claims, 6 Drawing Sheets

Related U.S. Application Data continuation of application No. 14/154,615, filed on Jan. 14, 2014, now Pat. No. 9,230,133.

(51) Int. Cl.
 *G06F 21/62* (2013.01)
 *G06F 17/30* (2006.01)
 *G06F 21/60* (2013.01)
 *H04L 29/06* (2006.01)

(52) U.S. Cl.
 CPC ...... *G06F 21/6227* (2013.01); *G06F 21/6245* (2013.01); *H04L 9/3247* (2013.01); *H04L 63/123* (2013.01)

(58) Field of Classification Search
 USPC .......................................................... 713/176
 See application file for complete search history.

(56) References Cited

U.S. PATENT DOCUMENTS

| | | | |
|---|---|---|---|
| 7,073,063 | B2 | 7/2006 | Peinado |
| 8,215,546 | B2 | 7/2012 | Lin |
| 8,925,075 | B2 * | 12/2014 | Krendelev .............. H04L 9/008 380/28 |
| 2002/0029337 | A1 | 3/2002 | Sudia et al. |
| 2002/0194476 | A1 | 12/2002 | Lewis et al. |
| 2005/0021479 | A1 * | 1/2005 | Jorba ................. G06Q 20/3674 705/67 |
| 2008/0071688 | A1 | 3/2008 | Corbett et al. |
| 2008/0133418 | A1 | 6/2008 | Lehmann et al. |
| 2008/0268904 | A1 * | 10/2008 | Tanaka ................ H04M 1/7253 455/556.1 |
| 2009/0106110 | A1 | 4/2009 | Stannard et al. |
| 2011/0145593 | A1 * | 6/2011 | Auradkar ............ G06F 21/6218 713/189 |
| 2012/0163584 | A1 * | 6/2012 | Adjedj .................... H04L 9/003 380/28 |
| 2012/0239932 | A1 * | 9/2012 | Puiggali Allepuz .... H04L 9/008 713/170 |
| 2013/0159730 | A1 | 6/2013 | Asim et al. |
| 2015/0200783 | A1 | 7/2015 | Abt et al. |

OTHER PUBLICATIONS

IBM, "IBM Mobile Identity," IBM Emerging Technologies—jStart—On the Horizon—Mobile Identity, http:/www-01.ibm.com/software/ebusiness/jstart/mi (last accessed Apr. 9, 2014 11:06 AM).

IBM, "Identity governance," IBM Research—Zurich, Computer Science, Idemix, http:/www.zurich.ibm.com/security/idemix, (last accessed Apr. 9, 2014 11:18 AM).

IBM, "Mobile Identity: A cryptographic framework for issuing, managing, and challenging digital identification documents," http://www-01.ibm.com/software/ebusiness/jstart/dowloads/mi6x20.pdf.

Keolabs, "IS018013 e-Driving License Confor+mance Solutions," http://www.keolabs.com/iso18013.html, (accessed May 29, 2014, 1:21 PM).

Microsoft, "U-Prove," http:/research.microsofl.com/en-us/projects/u-prove (last accessed Apr. 9, 2014 11:19 AM).

New York State, Department of Environmental Conservation, "Lifetime Sporting Licenses," http://www.dec.ny/gov/permits/6099.html, Copyright © 2014 New York State Department of Environmental Conservation (accessed May 29, 2014, 1:19PM).

Toups, D., "License, registration and smartphone," http://www.carinsurance.com/Articles/states-smartphone-proof-of-insura . . . (last updated Mar. 31, 2014; last accessed Apr. 25, 2014 3:52 PM).

Wong, A., "Driver's Licenses Contain Too Much Personal Info to Use at a Bar," Future Tense, ASU, The Citizen's Guide to the Future (last modified Apr. 4 2014 9:46 AM, last accessed Apr. 9, 201410:59 AM).

Redpath, "Using Multiple Digital Identification Documents to Control Information Disclosure", U.S. Appl. No. 14/295,892, filed Jun. 4, 2014.

Gisolfi, Daniel A., et ai, "Management of Digital Copies of Registrations Using Mobile Devices," U.S. Appl. No. 14/278,552, filed May 15, 2014.

IBM, "List of IBM Patents or Patent Applications Treated as Related."

Abt, JR et al., "Secure Access for Sensitive Digital Information," U.S. Appl. No. 14/154,615, filed Jan. 14, 2014.

* cited by examiner

SECURE ACCESS FOR SENSITIVE DIGITAL INFORMATION

CROSS REFERENCE TO RELATED APPLICATION

This application is a continuation of U.S. patent application Ser. No. 14/471,193, filed Aug. 28, 2014, which is a continuation application of U.S. patent application Ser. No. 14/154,615, filed Jan. 14, 2014, the entire content and disclosure of which is incorporated herein by reference.

BACKGROUND

The present disclosure relates to verification of digital data elements, and more specifically, to verifying the integrity of relationships between digital data elements.

Cryptographic functions and algorithms can be used to help protect sensitive data, such as personal information about an individual. A first type of cryptographic function is a symmetric-key algorithm. Symmetric-key algorithms use the same cryptographic key for both encryption and decryption. Both the sending and receiving party should maintain the secrecy of the key in order to prevent a third party from gaining access to the encrypted information.

A second type of cryptographic function is an asymmetric-key algorithm. Asymmetric key algorithms can be used in a variety of manners. In one instance, a first party can encrypt data using a first (private) key. A second party can then decrypt the data using a second (public) key. This can be useful for verifying the source of the data as only the owner of the private key can encrypt data that will be decrypted using the associated public key. Alternately, the second party could encrypt data using the public key and the first party can then decrypt the data using its private key. This can be helpful to ensure that only the owner of the private key can decrypt the data. The use of two different keys can be useful for a variety of different applications. In some instances, the first party can use the private key to create a digital signature. The second party can then use the public key and digital signature to verify that the contents of the data were sent by the first party and have not been modified.

SUMMARY

Embodiments are directed toward a method for protecting sensitive pieces of information stored on an individual's device and using a device identification system. The method includes applying, for each sensitive piece of information, a function that integrates an identifier of the individual with a respective sensitive piece of information to create a respective identity element; digitally signing each identity element with a signature to create a trust group; and uploading the identity element and signature to the individual's device using an application that is configured to provide a subset of the sensitive pieces of information in response to a query.

Various embodiments include a method for verifying sensitive pieces of information. The method includes establishing a communication link between a verification device and an individual's device that stores a plurality of sensitive pieces of information about the individual; sending, to the individual's device, a query for a subset that includes at least two of the plurality of sensitive pieces of information about the individual; receiving, in response to the query and at the verification device, the subset; receiving, in response to the query and at the verification device, an identifier of the individual; verifying that each piece of sensitive information of the subset belongs to a same trust group by: applying a signature algorithm to a first piece of sensitive information from the subset and to the identifier, applying the signature algorithm to a second piece of sensitive information from the subset and to the identifier, and verifying, based upon a result from the signature algorithm, that the first piece of sensitive information and the second piece of sensitive information belong to a trust group defined by the identifier.

Certain embodiments are directed toward a system comprising: a verification device designed to establish a communication link between a verification device and an individual's device that stores a plurality of sensitive pieces of information about the individual; send, to the individual's device, a query for a subset that includes at least two of the plurality of sensitive pieces of information about the individual; receive, in response to the query and at the verification device, the subset; receive, in response to the query and at the verification device, an identifier of the individual; verify that each piece of sensitive information of the subset belongs to a same trust group by: applying a signature algorithm to a first piece of sensitive information from the subset and to the identifier, applying the signature algorithm to a second piece of sensitive information from the subset and to the identifier, and verifying, based upon a result from the signature algorithm, that the first piece of sensitive information and the second piece of sensitive information belong to a trust group defined by the identifier.

DETAILED DESCRIPTION

Figure 1:
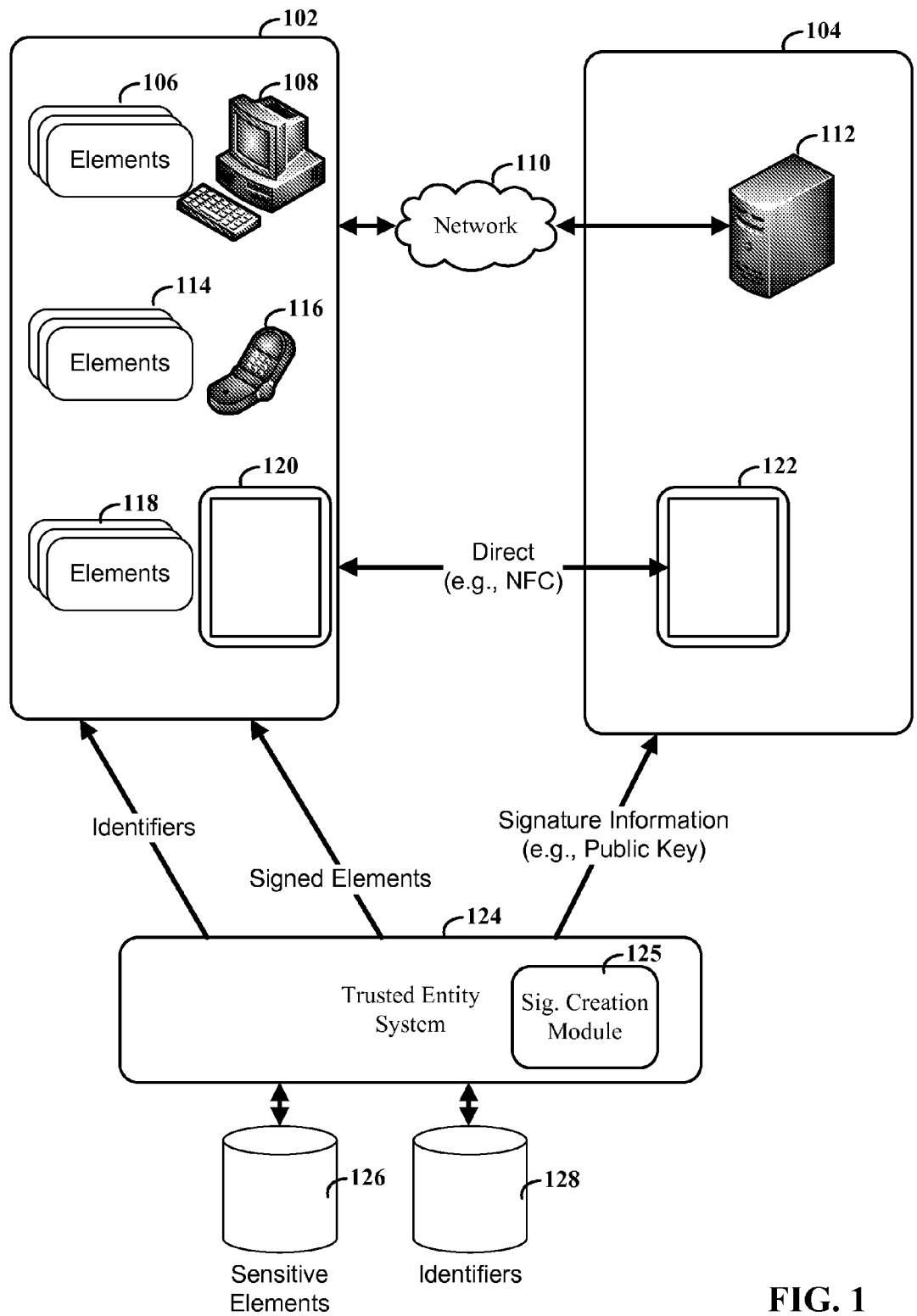
FIG. 1 depicts a block diagram for system useful for securing sensitive data elements, consistent with embodiments of the present disclosure.

Aspects of the present disclosure relate to securing and verifying sensitive information, and more particular aspects relate to securing an individual's sensitive information while providing a corresponding trust group therewith. While the present invention is not necessarily limited to such applications, various aspects of the invention may be appreciated through a discussion of various examples using this context.

Embodiments of the present disclosure are directed toward providing control over identity information in a manner that can provide flexibility and security. For instance, government identity cards provide a host of useful identity information. Much of this information, however, can be surplus for any particular transaction or verification. A retailer needing to verify that a customer's name matches that of a credit card may not need information about the customer's address, age, weight or other information on the card. A seller of age restricted goods (e.g., alcohol, cigarettes or firearms) may need to know that the customer is older than the restricted age, but not their address, actual age or other information. Aspects of the present disclosure facilitate the presentation of subsets of the set of available information depending upon the particular need, while providing verification of the various subsets.

Certain embodiments are directed toward the use of a digital grouping, or set, of sensitive data elements for an individual. This set of sensitive data elements can function in lieu, or in addition, to identification cards by including similar information. The set of sensitive data elements can be stored on an individual's electronic device such as, but not necessarily limited to, a smart phone, computer tablet, laptop computer, smart card, radio frequency identifier (RFID) card or personal computer. A verification device can be configured to interact with the individual's electronic device to request, or query, the individual's electronic device for particular pieces of sensitive information. The devices can be configured to use digital signature modules that allow for different sets of sensitive information to be verified with respect to the originator of the sensitive information (e.g., a governmental agency) and with one another (e.g., all for the same individual).

According to embodiments, group homomorphism can be created and used in connection with digital signatures for sensitive pieces of information. The homomorphism can be useful for reducing concerns over privacy of the sensitive information by facilitating the selective use of different combinations of sensitive pieces depending upon the particular need. For instance, the group homomorphism can be used to ensure that, for different combinations of the pieces of information, a verifying party can confirm both the integrity of the data content for sensitive pieces of information and that they are for the same individual.

Embodiments of the present disclosure make use of an identifier that is common between sensitive pieces of information that belong to the same individual and the same group. A different identifier can be used for each individual supported by the source of the sensitive pieces of information. For instance, the sensitive pieces of information could be part of a government identification package that contains information traditionally contained on a physical identification card, such as a government issued identification card (driver's license or otherwise). Each person that is issued an identification package could also be issued a different (unique) identifier. As non-limiting examples, the identifiers could be alphanumeric numbers, numbers (binary, hex or otherwise), image files or other types of files. This identifier can then be used to create the group homomorphism and thereby allow individual pieces of sensitive information to be verified with respect to their individual content as well as their relationship to one another.

Various aspects of the present disclosure are directed toward the use of a material equivalence of two groups having homomorphism to a unique identifier (x). The homomorphism can be defined as G→H or $\Phi_x(u+v)=\Phi_x(u)+\Phi_x(v)$, where $\Phi_x$ is a digital signature of the data that includes the unique identifier x and for which there is a homomorphism for the data. For instance, the homomorphism can be represented by valid trust relationship for the digital signature of the combined sensitive elements (u+v) and also for the separate digital signatures of each element $\Phi_x(u+v)$ and $\Phi_x(u)+\Phi_x(v)$ are each valid signatures).

For instance, a first data element (u) could represent an image file for a photograph of an individual and a second data element (v) could represent the name of the individual. If function $\Phi_x$ is used to sign the combination of both data elements (u+v), this results in a trust group G. The function $\Phi_x$ can also be used to sign each data element with the identifier x to establish a group homomorphism to a group H (FIG. 4, 400):

Group Homomorphism $$G \to H$$

$$\Phi_x(u+v)=\Phi_x(u)+\Phi_x(v)$$

The trust for the data elements in groups G and H can thereby be equivalent pursuant to the group homomorphism. This can be particularly useful for establishing that data elements belong to one another despite having been individually signed. This can also allow for multiple permutations of super groups with appropriate trust relationships. Each super group can be defined according to the particular use and application, such as providing name and age in one instance and address and gender in another.

Consistent with embodiments, an image file of a photo for the individual can be used as the common homomorphism (x) for the corresponding set of sensitive data elements. For instance, the sensitive data elements can be represented by image files. This could include image files of textual data, such as name or birth date. A first group (G) could be created that is a combination of two or more images. A function can then be applied in which the common homomorphism (x) is included as part of the digital signature. A second group (H) can also be created by applying the function to each sensitive data element individually. Consistent with certain embodiments, the common homomorphism can be an image file (x). Trust for two data elements can be verified by a visual overlay of the image file (x) from each sensitive data element. A visual disparity, as would occur due to data being for different individuals or images captured at different times, indicates a failed trust. In instances where the one of the sensitive data elements is also a file for the image of the individual, this image can also be added as part of the visual overlay. In certain embodiments, this sensitive data element of the image file can have a different (e.g., higher) resolution than the image file of the identifiers.

Consistent with embodiments, a function f: G->H between two groups is a homomorphism when f(xy)= f(x)f(y) for all x and y in G. The multiplication of xy is in G and the multiplication of f(x)f(y) is in H, so the homomorphism from G to H involves a function that transforms the operation G to the operation in H. Examples of two homeomorphisms include: $e^{x+y}=e^x e^y$ and $\log_a(xy)=\log_a(x)+\log_a(y)$. The log function provides an example of a binary operation of multiplication that can translate to a binary operation of addition for a function.

As non limiting examples, the data elements could be part of a virtual identification card. The virtual identification card can be display a desired subset of data elements that are visible within a card like outline. This card could be use for purposes such as driver's licensing, governmental identifier cards, healthcare cards, insurance cards, credit cards, security identifier cards for businesses or government, and others.

Turning now to the figures, FIG. 1 depicts a block diagram for system useful for securing sensitive data elements, consistent with embodiments of the present disclosure. According to embodiments of the present disclosure, a trusted entity 124 system can be configured to provide information about a group of individuals in the form of a plurality of sensitive pieces of information about each individual. For instance, the trusted entity could be a government agency that traditionally issues identification cards, driver's licenses, hunting licenses or similar items. A computer system of the trusted entity can access databases that contain sensitive pieces of information (sensitive element database 126). Consistent with embodiments, the trusted entity can also use a set of identifiers for the individuals, which can be stored in identifiers database 128. As discussed herein, the identifiers can take a number of different forms including, but not limited to, alphanumeric characters, binary strings, image files and combinations thereof.

Consistent with embodiments, the trusted entity system 124 can include a signature creation module 125. Signature creation module 125 can be configured and designed to use the sensitive elements and identifiers to create a homomorphism relative to trust for a first group in which a plurality of sensitive data elements are analyzed as a single entity and trust for a second group in which the sensitive data elements are individual analyzed. For instance, the signature creation module 125 can be configured to use a function that signs each sensitive data element individually, but also using an identifier for the corresponding individual for this signature creation.

The signed elements and identifiers can then be provided, or uploaded, to electronic devices 102, which can be owned by the individuals corresponding to the sensitive data elements. A variety of different electronic devices can be used including, but not necessarily limited to, personal computers 108, smart phones 116, tablets 120, RFID cards, and smart cards (not shown). Each device can store one or more sets of sensitive elements 106, 114, 118, along with a corresponding identifier. These sensitive elements 106, 114, 118 may then be used to provide verification of different attributes associated with the individual.

In certain embodiments, verification devices 104 can be configured to establish a communication link with one or more of the electronic devices 102. This link can be made over a variety of different mediums and using various protocols including, but not limited to, the use of networks 110 (e.g., local area networks, wide area networks, the Internet and combinations thereof), direct communication links (e.g., near field communication (NFC), Bluetooth, IEEE 802.xx and combinations thereof). In certain embodiments, the verification devices can include computer servers 112, handheld devices 122 or other electronic devices.

According to embodiments, verification devices 104 can query the electronic devices 102 for particular elements 106. These queries can be limited so as to exclude extraneous sensitive information relative to the particular purpose of the query. For instance, a bartender may have a need to confirm that a person is who they say they are and that they are over 21 years old. Additional information, such as address, weight, gender and other, may not be required or even desirable. For instance, by limiting the query to only specified information by the individual and querying party can have confidence that unnecessary information will not be misused because it is not being provided.

In response to such a query, the electronic devices 104 can provide the appropriate elements along with the associated identifier. The verification devices 104 can be configured to apply a function that takes advantage of the group homomorphism created by the use of the associated identifier. This can facilitate the ability to verify trust between different sets of elements.

Figure 2:
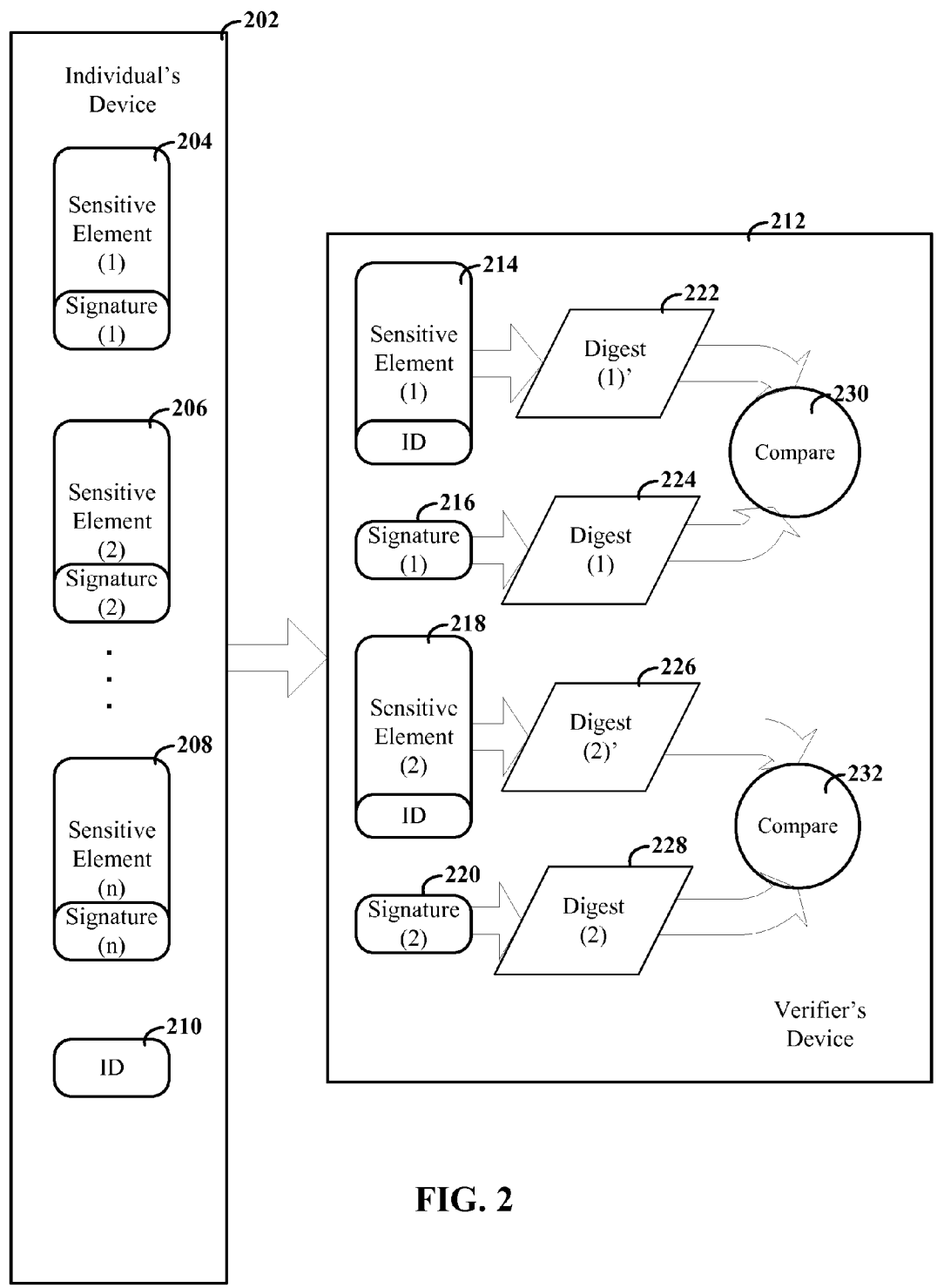
FIG. 2 depicts a flow diagram for verifying trust of sensitive elements of an individual, consistent with embodiments of the present disclosure.

FIG. 2 depicts a flow diagram for verifying trust of sensitive elements of an individual, consistent with embodiments of the present disclosure. An individual's electronic device 202 can store a number of different sensitive (data) elements 204, 206, 208. As discussed herein, each of these sensitive elements can contain data about the individual (e.g., one or more of: a name, an address, a date of birth, license status, an image of the individual, a driver's license number, an expiration date and physical characteristics of the individual). Moreover, the sensitive data elements can also each have a corresponding signature, which was generated in a manner that creates a group homomorphism related to the trust between the different sensitive elements.

Verification device 212 can receive subset of the sensitive elements in response to a query. For instance, the verification device may receive (e.g., from a trusted entity database) and store local copies 214, 216, 218, 220 of sensitive element (1), signature (1), sensitive element (2) and signature (2), respectively. The identifier 210 can also be provided and stored locally. A verification function can then be applied to confirm the authenticity of both the data and the trust between the elements.

For instance, the function can use the signature (1) and signature (2) to create digest (1) 224 and digest (2) 228. Using a signature protocol, such as Digital Signature Standard (DSS) and corresponding algorithm (e.g., digital signature algorithm (DSA)), digest (1) and digest (2) can be generated by applying a public key of the trusted entity to decrypt the corresponding signatures. The verification device 212 can also create digest (1)' and digest (2)' from sensitive element (1) and (2), respectively. Consistent with certain embodiments, the digest' can be generated using a one-way (hash) function, such as secure hash algorithm-1 (SHA-1) or SHA-2. The second set of digests can also be generated using a function that takes advantage of the homomorphism derived from the use of the identifier with each sensitive element.

The verification device can be configured to compare 230, 232 the digest derived from a signature with a corresponding digest derived from the content of a sensitive element. A match between digests can indicate that the data is authentic and can be trusted. A mismatch indicates a potential security or integrity issue with the data. As each comparison also verifies the identifier, a match also verifies that the sensitive elements belong to the same trust group. Two sensitive elements are depicted in FIG. 2, but additional sensitive elements can be received and verified using the group homomorphism that is based upon the common identifier.

The verifier can be notified of the results of the verification using a variety of different indicators. These can include, but are not necessarily limited to, displaying text or graphics (e.g., "fail" or "success"), generating audio (e.g., tones or voice), showing a visual disparity between two images (e.g., disparity of images of different individuals) and combinations thereof.

Figure 3:
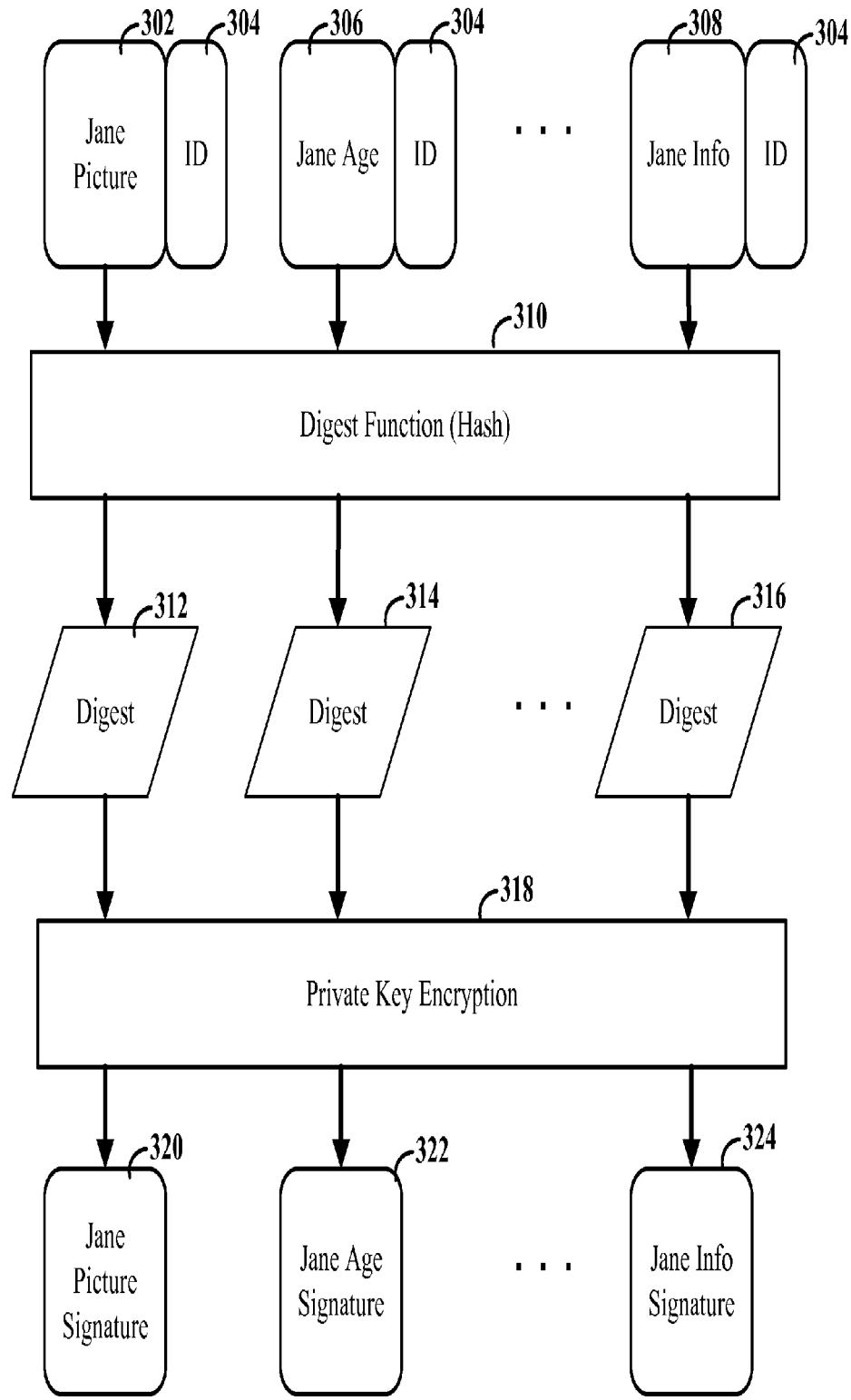
FIG. 3 depicts a flow diagram for signing sensitive data elements using a homomorphism relating to a trust between the elements, consistent with embodiments of the present disclosure.

FIG. 3 depicts a flow diagram for signing sensitive data elements using a homomorphism relating to a trust between the elements, consistent with embodiments of the present disclosure. A set of sensitive data elements for an individual (e.g., Jane) can include a variety of different attributes and information about the individual including, but not limited to, a picture 302, an age 306 and other info 308. A signature creation module (e.g., signature creation module 125) can use a homomorphism that associates a common identifier (ID) 304 each of these sensitive data elements.

Consistent with embodiments, a digest 312, 314, 316 can be created for each of the sensitive elements using a digest function 310. As discussed herein, the digest function can include the use of a hash function and can create a homomorphism by adding the identifier to each piece of sensitive information to create an identity element and before creating the corresponding digest. For instance, the identifier could be a number that uniquely identifies the individual (Jane). The digest function 310 can append, or otherwise add, the identifier to the data content of each sensitive element (to create an identity element) before applying a hash function, such as SHA-1 or SHA-2. In another instance, the identifier could be an image file of the individual (Jane). The digest function 310 could integrate the image file of the identifier with each sensitive element before applying a hash function. This integration could be at the binary level, at an image level (e.g., by merging the image of the identifier with an image of content of the sensitive data) or at other levels. The signature module can then encrypt each digest using a private key encryption algorithm 318 in order to generate signatures 320, 322 and 324.

The resulting signatures can be provided along with the sensitive elements and identifiers to the proper individuals. For instance, Jane could receive a smart card that stores this information. The information could also be uploaded to an electronic device, such as a smart phone, tablet or computer. A software application could also be loaded onto the electronic device in order to coordinate communications with a verification device.

Figure 4:
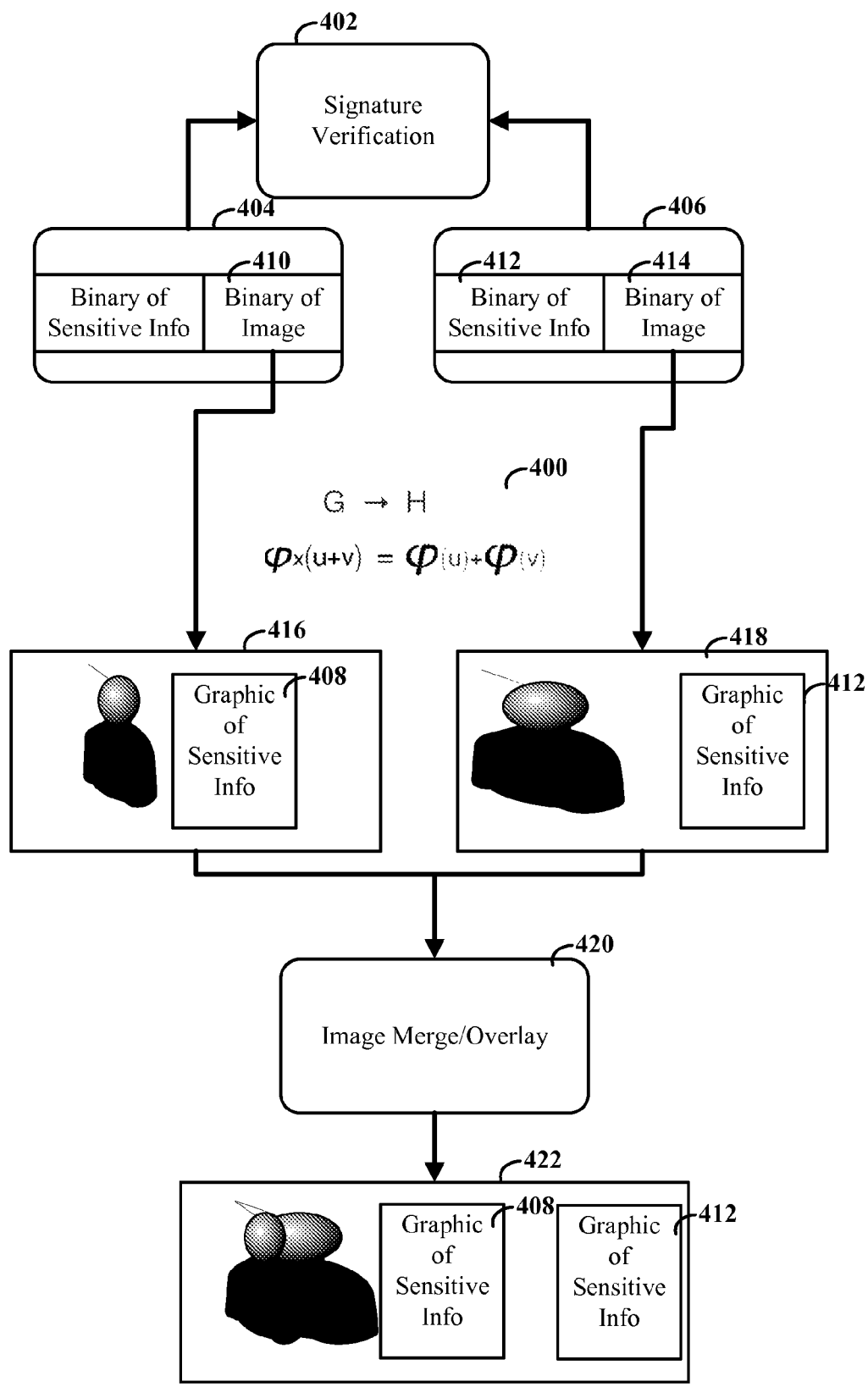
FIG. 4 depicts a flow diagram for using a homomorphism that is based upon image files of individuals, consistent with embodiments of the present disclosure.

FIG. 4 depicts a flow diagram for using a homomorphism that is based upon image files of individuals, consistent with embodiments of the present disclosure. Consistent with certain embodiments, the group homomorphism 400 can be based upon an image file containing an image of the individual associated with a set of sensitive data elements. For instance, a verification device may receive two pieces of sensitive information 404, 406 (sensitive data elements), which can be a subset of the available information to prevent unnecessary disclosure of the remaining, unused, sensitive information. These sensitive elements may include binary information 408, 412 for each sensitive data element as well as an image file 410, 414 (identifiers).

Individuals may attempt to mix sensitive elements from different individuals as a deception. For instance, a first individual (Jane) may attempt to use sensitive information of Jane (408) and at the same time use sensitive information (412) that is for a second individual (Joe). For instance, Jane may be under 21, while Joe is over 21. Jane may be attempting to deceive a bartender by providing her identity information (408) with Joe's age information (412).

In order to successfully verify (402) the sensitive information of Joe, Jane will provide Joe's identifier (binary image file 414). In order to successfully verify (402) the sensitive information of Jane, Jane will provide her own identifier (binary image file 410). Various embodiments are directed toward an additional trust verification in which the images 416, 418 are merged 420 to produce an overlay 422 from the image files 410, 414. This overlay can be displayed to the verifier. If the image files are for different individuals, the verifier will be able to see the visual disparity in the overlay 422.

In certain embodiments, the images 416, 418 can also include a (graphic/textual) visible representation of the sensitive information 408, 412. The overlay 422 can thereby include and display the desired subset of information as well as the visual overlay of the images. Various embodiments also allow for the use of additional information as to whether or not the verification succeeded (e.g., graphics, text or audio that indicate a failed or successful verification)

In certain embodiments, one of the sensitive elements may also be an image file for the image of the individual. This image file can be identical to the identifier(s) or it may have a different resolution, but still be of the same underlying image. This image file can also be added to the overlay. Consistent with embodiments of the present disclosure, the binary image files can be of a variety of images other than the corresponding individuals but yet uniquely linked to an individual including, but not limited to, text (e.g., text of an alphanumeric identifier).

Figure 5:
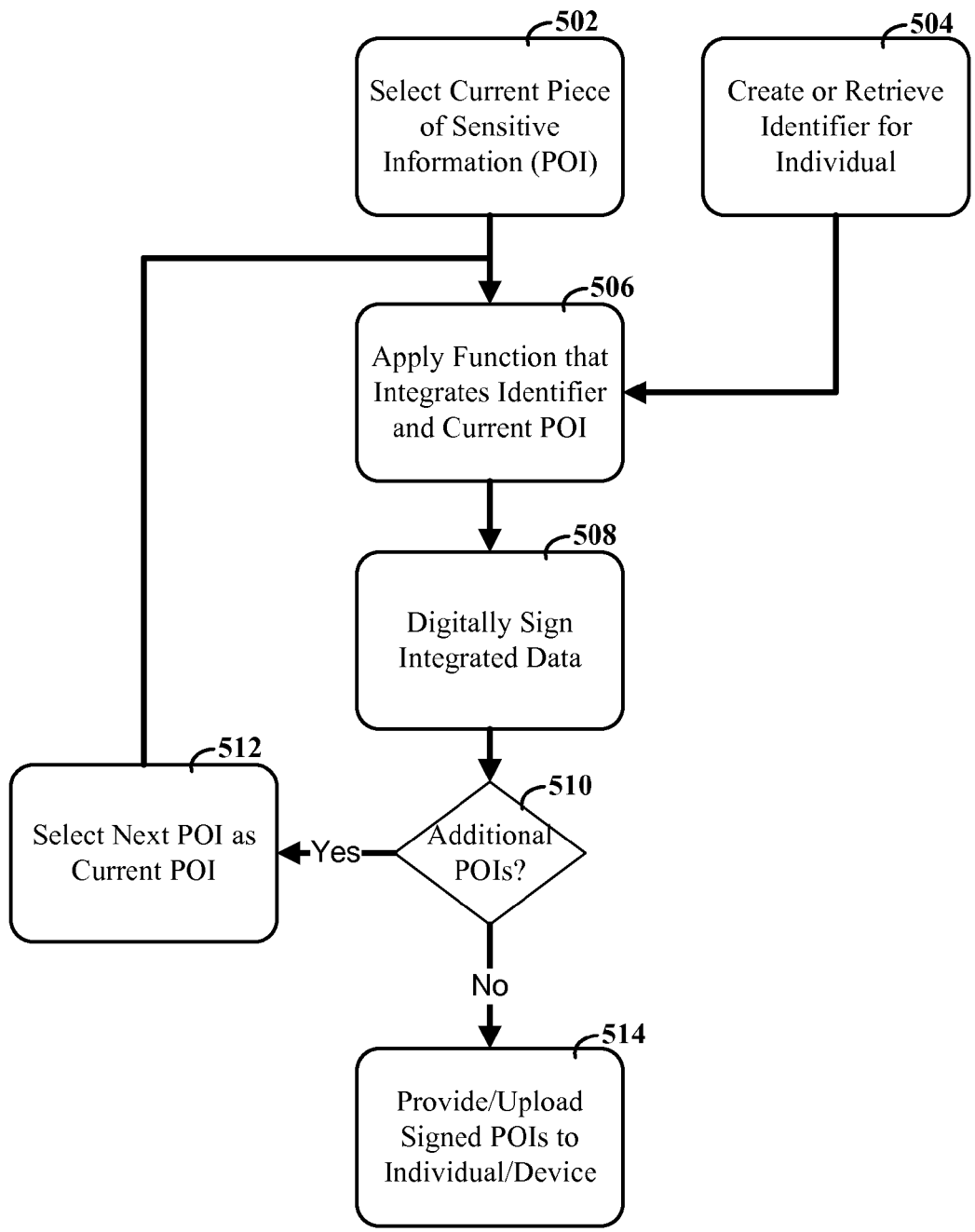
FIG. 5 depicts a flow diagram for a process of generating a homomorphism between multiple pieces of sensitive information, consistent with embodiments of the present disclosure.

FIG. 5 depicts a flow diagram for a process of generating a group homomorphism between multiple pieces of sensitive information, consistent with embodiments of the present disclosure. According to embodiments, this process can be implemented by a trusted entity system, such as the trusted entity system 124 of FIG. 1. The process can begin by selecting a current piece of sensitive information (POI) for an individual, per block 502. The process can also include creating or retrieving an identifier for the individual, per block 504. As discussed herein, this identifier can be used to create a group homomorphism in which the trust relationship between a first group (G) of the entire set of sensitive information of the individual is maintained for a group (H) containing subsets of the entire set of sensitive information of the individual.

Consistent with embodiments, a function can be applied that integrates the identifier with the current POI, per block 506. This integration can take a variety for different forms including, but not limited to, appending the identifier as a binary operation, appending the identifier in the image space or applying a more complex function based upon these two inputs.

The integrated output can then be digitally signed, per block 508. As discussed herein, the digital signature process can include the creation of a digest, which can then be encrypted using a private key encryption algorithm (e.g., consistent with DSS and DSA).

The system can then determine whether or not there are additional POIs, per block 510. If there are additional POIs, the system can select/set the next POI as the current POI, per block 512. The process can then proceed at block 506 using this new POI. If there are no additional POIs, then the system can provide or upload the signed POIs to the corresponding individual's device(s).

Figure 6:
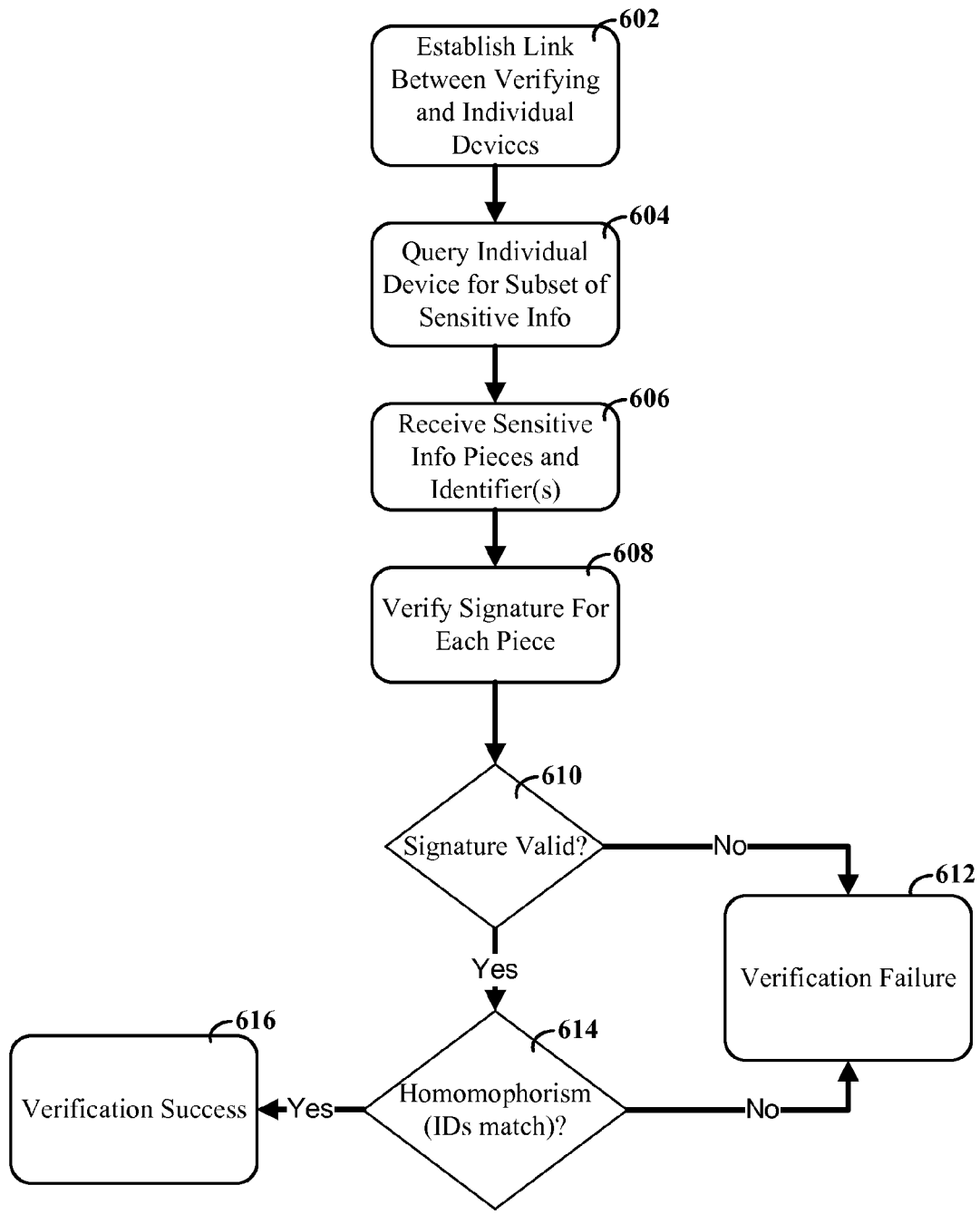
FIG. 6 depicts a flow diagram for a process of verifying multiple pieces of sensitive information, consistent with embodiments of the present disclosure.

FIG. 6 depicts a flow diagram for a process of verifying multiple pieces of sensitive information, consistent with embodiments of the present disclosure. Consistent with embodiments, a communication link can be established between an individual's device and a verifying device, per block 602. As discussed herein, a variety of different types of communication links are possible. In certain embodiments the communication link can be established in response to a selection (e.g., as part of a software application) made by the individual, the verifier or both. The communication link can also be established automatically, such as in response to bringing the two devices within a proximity and using near field communication (NFC).

In various embodiments, the verification device can be configured to query the individual's device for a subset of the available sensitive information, per block 604. For instance, a verification device used by a police officer as part of a routine traffic stop may send query for name, license number, driving restrictions, but not query for home address information.

In response to the query, the individual's device can provide the requested subset of information, which is then received by the verification device, per block 606. In addition, the verification device can receive an identifier that can be used to verify that the separate pieces of information belong to a single trust group.

The verification device can then verify each piece of information, per block 608. This verification can include verifying using a provided signature and a function that uses the provided identifier in combination with the provided pieces of information. The verification device can then determine whether or not any of the signature-based verifications failed, per block 610. If so, then the verification process can be considered a failure, per block 612. It not, then the verification device can also verify that the pieces of information belong to the same trust group (using the homomorphism that is based upon the use of a common identifier), per block 614. If this verification fails, then the verification process fails, per block 612. Otherwise, the verification can be considered successful, per block 616.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for verifying authenticity of sensitive pieces of information, the method comprising:

receiving, at a processor device of a computer system, one or more sensitive pieces of information associated with an individual, said sensitive pieces of information received from a device associated with the individual over a communications link;

obtaining, at the processor device, an identifier from the individual used in forming a group homomorphism;

obtaining, at the processor device, a respective signature element corresponding to a received sensitive piece of information, said corresponding signature element having being previously generated by integrating, using a digest function, the identifier of the individual with the respective sensitive piece of information about the individual to create a respective digest, and by encrypting the respective digest with an private key encryption function to form the respective signature element;

generating, by the processor device, a digest corresponding to the received sensitive piece of information by applying the digest function to an identity element, the identity element used in forming the group homomorphism by one of: integrating, adding or appending the obtained identifier to the received sensitive piece of information;

applying, at the processor device, a corresponding public key function to the received corresponding signature element to derive a digest corresponding from the obtained respective signature corresponding to the respective sensitive piece of information received;

comparing, using the processor device, said generated digest and corresponding derived digest of the received sensitive piece of information;

verifying whether a content of said received sensitive piece of information is authentic based on a result of said comparing, and providing an output indication of a success or failure of said verifying.

2. The method of claim 1, further comprising:

repeating, for each received sensitive piece of information:

said generating, by the processor device, a digest corresponding to the received sensitive piece of information, said deriving a corresponding digest, said comparing and said verifying, wherein a match between a digest and a corresponding derived digest indicates that a content of said piece of sensitive information is authentic and verifies that the sensitive pieces of information belong to a same trust group defined by the identifier.

3. The method of claim 1, wherein the identifier is an alphanumeric character string.

4. The method of claim 1, wherein the identifier is a file having content comprising an image of the individual.

5. The method of claim 4, wherein the identifier is a first file having content comprising an image of the individual and at least one of the received sensitive pieces of information includes a second file having content comprising an image of the individual.

6. The method of claim 5, wherein the image content of the first file and image content of the second file are of a same image but at different resolutions.

7. The method of claim 4, wherein the digest function integrates the image content of the individual with the respective sensitive piece of information based upon the group homomorphism that establishes the trust group between the sensitive pieces of information.

8. The method of claim 1, wherein the digest function performs said integration by merging the image content of the individual with an image of content of each respective sensitive pieces of information.

9. The method of claim 1, wherein the digest function performs said integration by appending the image content of the individual as a binary operation, or appending the identifier of the individual in an image space.

10. The method of claim 1, wherein the comparing comprises:

visually overlaying an image content obtained from each sensitive pieces of information, said verifying including verifying whether a visual disparity exists between said overlayed image contents.

11. A verification apparatus comprising:

a processor device configured to:

receive one or more sensitive pieces of information associated with an individual, said sensitive pieces of information received from a device associated with the individual over a communications link;

obtain an identifier from the individual used in forming a group homomorphism;

obtain a respective signature element corresponding to a received sensitive piece of information, said corresponding signature element having being previously generated by integrating, using a digest function, an identifier of the individual with the respective sensitive piece of information about the individual to create a respective digest, and by encrypting the respective digest with an private key encryption function to form the respective signature element;

generate a digest corresponding to the received sensitive piece of information by applying the digest function to an identity element, the identity element used in forming the group homomorphism by one of: integrating, adding or appending the obtained identifier to the received sensitive piece of information;

apply a corresponding public key function to the received corresponding signature element to derive a digest corresponding from the obtained respective signature corresponding to the respective sensitive piece of information received;

compare said generated digest and corresponding derived digest of the received sensitive piece of information;

verify whether a content of said received sensitive piece of information is authentic based on a result of said comparing, and provide an output indication of a success or failure of said verifying.

12. The apparatus of claim 11, wherein the processor device is further configured to:

repeat, for each received sensitive piece of information, said generating a digest corresponding to the received sensitive piece of information, said deriving a corresponding digest, said comparing and said verifying, wherein a match between a digest and a corresponding derived digest indicates that a content of said piece of sensitive information is authentic and verifies that the sensitive pieces of information belong to a same trust group defined by the identifier.

13. The apparatus of claim 11, wherein the identifier is a file having content comprising an image of the individual.

14. The apparatus of claim 13, wherein the identifier is a first file having content comprising an image of the individual and at least one of the received sensitive pieces of information includes a second file having content comprising an image of the individual.

15. The apparatus of claim 14, wherein the image content of the first file and image content of the second file are of a same image but at different resolutions.

16. The apparatus of claim 13, wherein the processing device applies said digest function to integrate the image content of the individual with the respective sensitive piece of information based upon the group homomorphism that establishes the trust group between the sensitive pieces of information.

17. The apparatus of claim 13, wherein the processing device applies said digest function to merge the image content of the individual with an image of content of each respective sensitive pieces of information.

18. The apparatus of claim 13, wherein the processing device applies said digest function to append the image content of the individual as a binary operation, or append the identifier of the individual in an image space.

19. The apparatus of claim 13, wherein to compare, the processing device is further configured to:

visually overlay an image content obtained from each sensitive pieces of information, said verifying including verifying whether a visual disparity exists between said overlayed image contents.

20. A computer program product for verifying authenticity of sensitive pieces of information comprising:

a computer readable storage medium having program instructions embodied therewith, wherein the computer readable storage medium is not a transitory signal per se, the program instructions readable by a processing circuit to cause the processing circuit to perform a method to:

receive one or more sensitive pieces of information associated with an individual, said sensitive pieces of information received from a device associated with the individual over a communications link;

obtain an identifier from the individual used in forming a group homomorphism;

obtain a respective signature element corresponding to a received sensitive piece of information, said corresponding signature element having being previously generated by integrating, using a digest function, an identifier of the individual with the respective sensitive piece of information about the individual to create a respective digest, and by encrypting the respective digest with an private key encryption function to form the respective signature element;

generate a digest corresponding to the received sensitive piece of information by applying the digest function to an identity element, the identity element used in forming the group homomorphism by one of: integrating, adding or appending the obtained identifier to the received sensitive piece of information;

apply a corresponding public key function to the received corresponding signature element to derive a digest corresponding from the obtained respective signature corresponding to the respective sensitive piece of information received;

compare said generated digest and corresponding derived digest of the received sensitive piece of information;

verify whether a content of said received sensitive piece of information is authentic based on a result of said comparing, and provide an output indication of a success or failure of said verifying.

* * * * *